2,819,251
FORMALDEHYDE-PHENOL CONCENTRATES

George K. Cleek, Hopewell, and Alexander Sadle, Petersburg, Va., assignors to Allied Chemical & Dye Corporation, New York, N. Y., a corporation of New York No Drawing. Application May 26, 1955
Serial No. 511,431

3 Claims. (Cl. 260—57)

This invention relates to formaldehyde-phenol concentrates and more particularly refers to a new and improved process for production of stable liquid formaldehyde-phenol concentrates containing a high percentage of formaldehyde adapted particularly for use in the manufacture of synthetic resins.

Formaldehyde for use by phenolic resin manufacturers is generally shipped as aqueous solutions containing about 37–45% by weight of formaldehyde. Thus a large portion of the shipping cost is for transporting of water. Moreover, these aqueous solutions of formaldehyde have a tendency to polymerize during shipment and storage and must be kept heated or inhibited with methanol to avoid this troublesome development. All of these factors increase the cost of formaldehyde without compensating benefit to the resin manufacturer.

Formaldehyde-phenol resins are generally produced in equipment sized to contain the large percentage of water present in commercial formaldehyde solutions. A decrease in water content of the starting materials will thus permit higher production rates for a given size of equipment. Processing cost for evaporation of water would also be decreased and reaction rates may be favorably affected.

Spurred on by the utility and economic importance many attempts over several past decades have been made to produce a stable formaldehyde-phenol concentrate but without significant commercial success. Recent U. S. Patent 2,609,352 issued September 2, 1952, describes a process for preparing polymethylolphenols by reacting 4–10 mols of 58–65% "monomeric" formaldehyde per mol of phenol. The process of this patent requires concentration of aqueous formaldehyde to 58–65% and immediate use of the formaldehyde solution in heated state. Further, the procedure of the patent limits the concentration of the product to less than 70% solids content or, stated conversely, has 30% or more water.

One object of the present invention is to provide an efficient process for the production of stable formaldehyde-phenol concentrates containing a high percentage of formaldehyde. Another object of the present invention is to provide a stable formaldehyde-phenol concentrate containing in excess of 75% solids. A further object is to provide an economical method of producing concentrates of formaldehyde-phenol from uninhibited commercial formaldehyde solutions containing 37–45% by weight of formaldehyde.

In accordance with the present invention, stable liquid formaldehyde-phenol concentrates are prepared by admixing 30–50 weight percent aqueous formaldehyde solution, preferably uninhibited, with phenol having a concentration in excess of 80% by weight in the molar proportion of 4–7 mols formaldehyde for each mol phenol, preferably in the molar proportion of 5–6 mols formaldehyde for each mol phenol, adjusting the pH of the mixture to within the range of 7–9, preferably 7–7.5, heating the reaction mixture to a temperature within the range of 60–100° C., preferably 80–100° C., until the free formaldehyde content of the reaction mixture drops to within the range of below 22 weight percent and above 16 percent by weight of the reaction mixture, preferably ing the reaction mixture by subjecting the mixture to subatmospheric pressure at a temperature above 40° C. and below 70° C., preferably within the range of about 45°–55° C., until the solids content in the reaction mixture increases to within the range of 75–90% by weight, preferably within the range of 78–88% by weight, and adjusting the pH of the concentrated formaldehyde-phenol to within the range of 5–7.5, preferably 6–7.

The process of the present invention may be carried out in conventional resinification equipment such as a steam jacket kettle equipped with a reflux condenser. Into the kettle is charged a commercial uninhibited formaldehyde solution having a concentration below 50% and above 30%. In the process of the present invention it is unnecessary to employ a solution of formaldehyde inhibited with methanol to reduce polymerization and this is of material economic importance because methanol adds to the cost of the operation and is a contaminant in the product. Phenol in the proportion of 1 mol of phenol to 4–7 mols of formaldehyde is added to the charging kettle. For ease in handling a concentrated aqueous phenol solution containing more than 80% by weight phenol may be utilized as a charge to the kettle or if desired purer phenol may be melted and the melt poured into the charge kettle. To the reaction mixture is added alkaline material such as alkali metal or alkaline earth metal compounds, as for example sodium hydroxide, potassium hydroxide, sodium carbonate or potassium carbonate, calcium hydroxide, calcium carbonate or organic bases such as triphenylamine, until the pH of the reaction mixture is within the range of 7 to 9. At a pH above 9 the reaction is difficult to control while at a pH below 7 the product is unsatisfactory. The preferred pH range is 7–7.5.

After adjusting the pH of the phenol-formaldehyde mixture in the kettle, the contents are agitated and the mixture heated to a temperature in excess of 60° C., preferably within the range of 80–100° C. At temperatures below about 60° C. the reaction is impractically long and the product unsatisfactory. At temperatures appreciably above 100° C. the reaction is most difficult to control. The rate of reaction is affected not only by the temperature within the specified range but also is proportional to the (OH)⁻ concentration, for example at 80° C. the reaction time required to lower the free formaldehyde content of the reaction mixture to 20–22 weight percent is about 11 hours at pH 7.3, about 2 hours at pH 8 and only 0.25 hour at pH 8.8. At pH 8 raising the temperature from 80 to 90° C. reduces the reaction time from 2 hours to 1 hour while at 30° C. no significant reaction was observed in 24 hours. The pH of the reaction mixture may be maintained during the reaction by the addition to the reaction mixture in the kettle of controlled amount of an alkaline solution as for example, aqueous sodium hydroxide. The operation is conveniently carried out at substantially atmospheric pressure; superatmospheric and subatmospheric pressures may be employed but are generally unnecessary. Heating of the reaction mixture under controlled pH and temperature is continued until the free formaldehyde content of the reaction mixture drops to within the range of less than 22% and more than 16%, preferably within the range of 18–20% by weight of the reaction mixture. Ordinarily this may be accomplished from about 1–4 hours. It is important to carry the reaction until the free formaldehyde content is less than 22 weight percent or else the resultant product is unsatisfactory. Decreasing the free formaldehyde content below 16 weight percent does not increase the stability of the product and is undesirable.

The combined formaldehyde according to our analysis is present as 2,4-dimethylolphenol, sym-trimethylolphenol, o- and p-methylolphenol, 2,6-dimethylolphenol and 3,3', 5,5'-tetramethylol-4,4'-dihydroxydiphenylmethane. Upon completion of the reaction the reaction mixture containing roughly 50% by weight solids and 50% water is concentrated by evaporation at subatmospheric pressures, for example about 30–75 mm. Hg pressure abs. in a conventional steam jacketed long tube evaporator. Evaporation is continued at a temperature of 40–70° C. until over 40% water by weight of the charge is removed leaving as liquid residue a formaldehyde-phenol concentrate containing over 75%, generally over 78% solids and less than 22% water. The water distillate during evaporation carried with it only minor amounts of phenol and formaldehyde which may be recovered. The formaldehyde-phenol concentrate consists approximately of 30% phenol, 55 weight percent formaldehyde of which 35 weight percent is free, and 15% water. It is important that the pH of the concentrate be adjusted within the range of 5–7.5, preferably 6–7, before storage in order to assure a more stable concentrate that does not appreciably change in composition or viscosity during a storage period of several months. The reaction step can be carried out at pH of 7–7.5, if desired, so that further pH adjustment of the product is unnecessary. Adjustment of the pH may be accomplished by the addition of formic acid or other acids such as acetic, oxalic, sulfuric and hydrochloric.

The formaldehyde-phenol concentrates prepared in accordance with the present invention are equivalent to about 55% formaldehyde, 30% phenol and 15% water, by weight, and provide a practical and economical means for shipping formaldehyde in high concentration to phenolic resin producers. These formaldehyde-phenol concentrates are stable liquid products at ordinary temperatures. They are mobile fluids at about 25° C. and may be pumped or allowed to flow by gravity. These concentrates can be utilized for phenol and aqueous formaldehyde in standard phenolic resin preparation, e. g. in preparation of phenolic molding powders. The formaldehyde-phenol concentrates have a stable water dilutability of 3–4 ml. of water per ml. of concentrate. For use in the production of water soluble resins the water dilutability of water concentrates can be increased to a value of 50 or more by adding a small amount of NaOH solution to the concentrates. The concentrates are miscible with methanol, ethanol, butanol and acetone. Paper chromatography tests show that these concentrates do not change significantly during several months storage.

The following examples illustrate the present invention.

*Example 1*

427 parts by weight of an 88 weight percent aqueous solution of phenol was adjusted to pH 8 with 9.4 parts by weight of 20 weight percent NaOH solution. 1962 parts by weight of a 36.7 weight percent uninhibited formaldehyde solution was adjusted to a pH 8 with 3.6 parts by weight of 20 weight percent NaOH solution. The phenol and formaldehyde solutions (in the proportion of 6 mols formaldehyde to 1 mol phenol) were then mixed at room temperature. The reaction mixture was agitated and heated to 80° C. The temperature was held at 80° for two hours and pH of 8 was maintained by gradual addition of 17 parts by weight of a 20 weight percent NaOH solution. When the free formaldehyde content of the reaction mixture (as determined by 0° C. sulfite titrations) decreased from 30 to 21.1%, the reaction mixture was concentrated by evaporation at 50 mm. Hg pressure (abs.) in a steam jacketed long tube evaporator. About 47 weight percent of the charge to the evaporator was taken over at 45–50° C. The overhead from the evaporator contained about 4 weight percent formaldehyde and 1 weight percent phenol. The product was adjusted by the addition of formic acid to a pH of 5.5. The rate of change of viscosity of the product was determined over a period of several months and found to change in the insignificant amount of 0.3 centipoises per day. Merely for comparative purposes, two separate portions of the products were maintained in storage at a pH of 8 and 9 and after several months were found to degenerate appreciably as determined by the viscosity change which was 12 and 50 centipoises per day, respectively.

*Example 2*

At room temperature 749 parts by weight of an 88 weight percent aqueous solution of phenol was mixed with 3150 parts by weight of a 39.9 weight percent uninhibited formaldehyde solution (in the proportion 6 mols formaldehyde to 1 mol phenol). The pH of the mixture was adjusted to 7.3 with 5.3 parts by weight of 20 weight percent NaOH solution. The reaction mixture was agitated and heated to 95° C. The temperature was held at 93–97° C. and the pH maintained at 6.9–7.5 by gradual addition of 24 parts by weight of 20 weight percent NaOH solution. After about 3 hours reaction time the free formaldehyde content of the reaction mixture (as determined by 0° C. sulfite titrations) decreased from 32 to 20 weight percent. The reaction mixture was concentrated by evaporation at 50 mm. Hg pressure (abs.) in a steam jacketed long tube evaporator. About 41 weight percent of the charge to the evaporator was taken overhead at about 45° C. The overhead contained about 1 weight percent phenol and 5 weight percent formaldehyde. The product contained 26.8 weight percent phenol and 51.3 weight percent formaldehyde of which about 30 weight percent was free. The initial viscosity of the product was 84 centipoises and the change of viscosity during several months storage was 0.6 centipoise per day. The pH during storage was about 7.

Although certain preferred embodiments of the invention have been disclosed for purpose of illustration it will be evident that various changes and modifications may be made therein without departing from the scope and spirit of the invention.

We claim:

1. A process for the manufacture of a stable liquid formaldehyde-phenol concentrate which comprises admixing a 30–45 weight percent aqueous formaldehyde at about room temperature with phenol having a concentration in excess of 80 weight percent in the molar proportion of 4–7 mols formaldehyde for each mol phenol, adjusting the pH of the mixture to within the range of 7.0–9.0, heating the reaction mixture to a temperature within the range of 60–100° C. until the free formaldehyde content of the reaction mixture drops to within the range of below 22 percent and above 16 percent by weight of the reaction mixture, concentrating the reaction mixture by subjecting the mixture to subatmospheric pressure of 30–75 mm. Hg pressure absolute at a temperature above 40° C. and below 70° C. until the solids content in the reaction mixture increases to within the range of 75–90% by weight of the reaction mixture and adjusting the pH of the concentrated formaldehyde-phenol to within the range of 5.0–7.5.

2. A process for the manufacture of a stable liquid formaldehyde-phenol concentrate which comprises admixing an uninhibited 30–45 weight percent aqueous formaldehyde at about room temperature with a concentrated aqueous phenol solution containing in excess of 80% by weight phenol in the molar proportion of 4–7 mols formaldehyde for each mol phenol, adjusting the pH of the mixture to within the range of 7.0–9.0, heating the reaction mixture to a temperature within the range of 60–100° C. until the free formaldehyde content of the reaction mixture drops to within the range of 18–20% by weight of the reaction mixture, concentrating the reaction mixture by subjecting the mixture to subatmospheric pressure of 30–75 mm. Hg pressure absolute and at a temperature above 40° C. and below 70° C. until the solids content in the reaction mixture increases to within the range of 78–88% by weight of the reaction mixture and adjusting the pH of the concentrated formaldehyde-phenol to within the range of 5.0–7.5.

3. A process for the manufacture of a stable liquid formaldehyde-phenol concentrate which comprises admixing an uninhibited 37–45 weight percent aqueous formaldehyde at about room temperature with a concentrated aqueous phenol solution containing in excess of 80% by weight phenol in the molar proportion of 4–7 mols formaldehyde for each mol phenol, adjusting the pH of the mixture to within the range of 7.0–9.0, heating the reaction mixture to a temperature within the range of 60–100° C. until the free formaldehyde content of the reaction mixture drops to within the range of 18–20% by weight of the reaction mixture, maintaining the reaction mixture at a pH within the range of 7.0–9.0 during the reaction by the addition to the reaction mixture of controlled amounts of an aqueous alkaline solution, concentrating the reaction mixture by subjecting the mixture to subatmospheric pressure of 30–75 mm. Hg pressure absolute and at a temperature above 40° C. and below 70° C. until the solids content in the reaction mixture increases to within the range of 78–88% by weight of the reaction mixture and adjusting the pH of the concentrated formaldehyde-phenol to within the range of 5.0–7.5.

References Cited in the file of this patent
UNITED STATES PATENTS

| | | |
|---|---|---|
| 2,186,687 | Thompson et al. | Jan. 9, 1940 |
| 2,609,352 | Kvalnes | Sept. 2, 1952 |

U. S. DEPARTMENT OF COMMERCE
PATENT OFFICE

CERTIFICATE OF CORRECTION

Patent No. 2,819,251                                January 7, 1958

George K. Cleek et al.

It is hereby certified that error appears in the printed specification of the above numbered patent requiring correction and that the said Letters Patent should read as corrected below.

Column 2, line 4, after "preferably" insert -- to within the range of 18-20 weight percent, concentrat- --.

Signed and sealed this 1st day of April 1958.

(SEAL)
Attest:
KARL H. AXLINE                                             ROBERT C. WATSON
Attesting Officer                                      Commissioner of Patents